US005582770A

United States Patent [19]
Chu et al.

[11] Patent Number: 5,582,770
[45] Date of Patent: Dec. 10, 1996

[54] CONDUCTIVE POLYMER COMPOSITION

[75] Inventors: Edward F. Chu, Sunnyvale; Nelson H. Thein, Union City; Vijay Reddy, San Mateo; Daniel A. Chandler, Menlo Park, all of Calif.

[73] Assignee: Raychem Corporation, Menlo Park, Calif.

[21] Appl. No.: 255,497

[22] Filed: Jun. 8, 1994

[51] Int. Cl.$^6$ .............................. H01B 1/24; H01B 1/20; C08L 33/08; C08K 3/04
[52] U.S. Cl. .......................... 252/511; 252/500; 252/510; 525/227; 524/523
[58] Field of Search .................................. 252/500, 510, 252/511; 525/194, 913, 227; 524/523

[56] References Cited

U.S. PATENT DOCUMENTS

| | | | |
|---|---|---|---|
| 3,663,663 | 5/1972 | McAda | 525/227 X |
| 3,861,029 | 1/1975 | Smith-Johannsen et al. | 29/611 |
| 4,054,714 | 10/1977 | Mastrangelo | 252/514 X |
| 4,127,699 | 11/1978 | Aumiller et al. | 252/511 X |
| 4,237,441 | 12/1980 | van Konynenburg et al. | 252/511 X |
| 4,277,673 | 7/1981 | Kelly | 219/528 |
| 4,312,918 | 1/1982 | Bostwick | 525/227 X |
| 4,388,607 | 6/1983 | Toy et al. | 252/511 X |
| 4,426,633 | 1/1984 | Taylor | 338/25 |
| 4,508,640 | 4/1985 | Kanda et al. | 252/511 X |
| 4,534,889 | 8/1985 | van Konynenburg et al. | 252/511 |
| 4,545,926 | 10/1985 | Fouts et al. | 252/511 |
| 4,560,498 | 12/1985 | Horsma et al. | 252/511 |
| 4,576,993 | 3/1986 | Tamplin et al. | 525/240 |
| 4,591,700 | 5/1986 | Sopory | 252/511 X |
| 4,689,475 | 8/1987 | Matthiesen | 219/553 |
| 4,695,508 | 9/1987 | Kageyama et al. | 252/511 X |
| 4,700,054 | 10/1987 | Triplett et al. | 219/545 |
| 4,724,417 | 2/1988 | Au et al. | 338/22 R |
| 4,758,629 | 7/1988 | Deyrup et al. | 525/194 |
| 4,774,024 | 9/1988 | Deep et al. | 252/511 |
| 4,800,253 | 1/1989 | Kleiner et al. | 219/553 |
| 4,801,784 | 1/1989 | Jensen et al. | 219/548 |
| 4,871,810 | 10/1989 | Saltman | 525/189 X |
| 4,876,440 | 10/1989 | Kamath et al. | 219/548 |
| 4,910,389 | 3/1990 | Sherman et al. | 219/548 |
| 4,935,156 | 6/1990 | van Konynenburg et al. | 252/511 X |
| 5,049,850 | 9/1991 | Evans et al. | 252/511 X |
| 5,089,801 | 2/1992 | Chan et al. | 338/22 R |
| 5,250,228 | 10/1993 | Baigrie et al. | 252/511 |
| 5,272,210 | 12/1993 | Galante | 525/227 |
| 5,278,219 | 1/1994 | Lilley et al. | 524/439 |
| 5,298,194 | 3/1994 | Carter et al. | 252/512 |
| 5,378,407 | 1/1995 | Chandler et al. | 252/513 |
| 5,436,609 | 7/1995 | Chan et al. | 338/22 R |

OTHER PUBLICATIONS

Jia, Wentao, et al., "PTC Effect of Polymer Blends Filled with Carbon Black", Journal of Applied Polymer Science, 54(9)(Nov. 28, 1994), 1219–1221.

"Predicting the Properties of Mixtures: Mixture Rules in Science and Engineering", Lawrence E. Nelsen (Marcel Dekker, Inc., 1978), pp. 5–9.

*Primary Examiner*—Douglas J. McGinty
*Attorney, Agent, or Firm*—Marguerite E. Gerstner; Herbert G. Burkard; Timothy H. P. Richardson

[57] ABSTRACT

A conductive polymer composition containing a particulate conductive filler dispersed in a polymeric component. The polymeric component comprises a first polymer which (i) is present in an amount 25 to 75% by weight of the total polymeric component, and (ii) is polyethylene, and a second polymer which (i) is present in an amount 25 to 75% by weight of the total polymeric component, and (ii) comprises units derived from a first monomer which is ethylene and a second monomer which is an alkyl acrylate having the formula —$CH_2$=$CHCOOC_mH_{2m+1}$—, where m is at least 4. The resulting composition is useful in preparing electrical devices, e.g. circuit protection devices, which have lower resistivities, higher PTC anomalies, and better thermal and electrical stability than devices comprising conventional conductive polymer compositions.

13 Claims, 4 Drawing Sheets

CONDUCTIVE POLYMER COMPOSITION

BACKGROUND OF THE INVENTION

1. Field of the Invention

This invention relates to conductive polymer compositions and devices and assemblies comprising such compositions.

2. Introduction to the Invention

Conductive polymer compositions and electrical devices comprising them are well-known. Such compositions comprise a polymeric component, and dispersed therein, a particulate conductive filler such as carbon black or metal. Conductive polymer compositions are described in U.S. Pat. Nos. 4,237,441 (van Konynenburg et al), 4,388,607 (Toy et al), 4,534,889 (van Konynenburg et al), 4,545,926 (Fours et al), 4,560,498 (Horsma et al), 4,591,700 (Sopory), 4,724, 417 (Au et al), 4,774,024 (Deep et al), 4,935,156 (van Konynenburg et al), 5,049,850 (Evans et al), and 5,250,228 (Baigrie et al), and in pending U.S. application Ser. Nos. 07/894,119 (Chandler et al, filed Jun. 5, 1992), now U.S. Pat. No. 5,378,407, issued Jan. 3, 1995, Ser. No. 08/085,859 (Chu et al, filed Jun. 29, 1993), now U.S. Pat. No. 5,451,919, and Ser. No. 08/173,444 (Chandler et al, filed Dec. 23, 1993). The disclosure of each of these patents and applications is incorporated herein by reference.

Such compositions often exhibit positive temperature coefficient (PTC) behavior, i.e. they increase in resistivity in response to an increase in temperature, generally over a relatively small temperature range. The temperature at which this increase occurs is the switching temperature $T_s$ and may be defined as the temperature at the intersection point of extensions of the substantially straight portions of a plot of the log of the resistance of a PTC element against temperature which lie on either side of the portion of the curve showing a sharp change in slope. The increase from the resistivity at 25° C. ($\rho_{25}$) to a peak resistivity ($\rho_{peak}$, i.e. the maximum resistivity which the composition exhibits above $T_s$) is the PTC anomaly height.

PTC conductive polymer compositions are particularly suitable for use in electrical devices such as circuit protection devices, heaters, and sensors which respond to changes in ambient temperature, current, and/or voltage conditions. For many applications it is desirable that the composition have as low a resistivity and as high a PTC anomaly height as possible. A low resistivity allows preparation of small devices which have low resistance. Such devices need little space on a printed circuit board or other substrate and contribute little resistance to an electrical circuit during normal operation. A high PTC anomaly height allows the device to withstand the necessary applied voltage. Although the resistivity of a conductive polymer composition can be decreased by adding more conductive filler, it is generally the case that such an addition reduces the PTC anomaly, possibly by decreasing the amount of crystalline polymer which contributes to the PTC anomaly or by physically reinforcing the polymeric component and decreasing the expansion at the melting temperature.

In addition to a low resistivity and high PTC anomaly, the location of the switching temperature of the conductive polymer composition is also important. Some applications, e.g. automotive applications in which an electrical device is located under the hood, require that $T_s$ be sufficiently high that the polymeric component is not adversely affected by a high ambient temperature. For other applications, e.g. for battery protection, it is necessary that $T_s$ be low enough that there is no heat damage to the substrate or surrounding components when the device switches to the high temperature/high resistance state.

SUMMARY OF THE INVENTION

In order to achieve these objectives, compositions have been prepared from a blend of two or more polymers, each of which is selected to contribute to the properties of the final mixture. For example, in a mixture of high density polyethylene (HDPE) and ethylene/acrylic acid copolymer (EAA), the lower melting copolymer triggers $T_s$ and the more crystalline polyethylene contributes to increase the height of the PTC anomaly.

We have now discovered that improved properties are obtained by replacing at least part of the EAA by an alkyl acrylate in which the alkyl group contains at least four carbon atoms. The resulting compositions have improved low resistivity and high PTC anomaly height over conventional compositions, as well as improved electrical and thermal stability. In addition, eliminating the acrylic acid functionality present in the EAA decreases the acidic nature of the composition, thus decreasing the need for expensive, acid-resistant nickel metal foil electrodes when the compositions are used in electrical devices. In a first aspect, this invention discloses a conductive polymer composition comprising (A) a polymeric component which comprises
  (1) a first polymer which (a) is present in an amount 25 to 75% by weight of the total polymeric component, and (b) is polyethylene, and
  (2) a second polymer which (a) is present in an amount 25 to 75% by weight of the total polymeric component, and (b) comprises units derived from (i) a first monomer which is ethylene, and (ii) a second monomer which is an alkyl acrylate having the formula $-CH_2=CHCOOC_mH_{2m+1}-$, where m is at least 4; and (B) a particulate conductive filler which is dispersed in the polymeric component.

In a second aspect this invention provides an electrical device which comprises (A) a element composed of a conductive polymer composition of the first aspect of the invention; and
(B) at least one electrode which is suitable for connecting the conductive polymer element to a source of electrical power.

In a third aspect this invention provides an assembly which comprises (I) a circuit protection device which comprises an element composed of a conductive polymer composition of the first aspect of the invention and at least one electrode which is suitable for connecting the conductive polymer element to a source of electrical power, and
(II) a battery which is electrically connected to the circuit protection device.

DETAILED DESCRIPTION OF THE INVENTION

Figure 1:
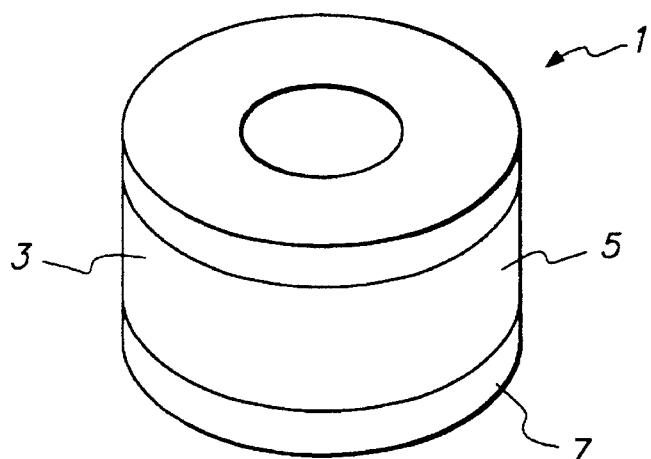
FIG. 1 is a plan view of a device of the invention.

The polymeric component of the composition comprises first and second polymers, each of which is crystalline, i.e.

has a crystallinity of at least 10%, preferably at least 20%. The polymeric component generally comprises 30 to 80% by weight, preferably 35 to 75% by weight, particularly 40 to 70% by weight of the total weight of the composition.

The first polymer is polyethylene, e.g. high density polyethylene, medium density polyethylene, low density polyethylene, linear low density polyethylene, or a mixture of two or more of these polyethylenes. For compositions which must survive exposure to thermal environments greater than about 100° C. it is preferred that the polyethylene be high density polyethylene, i.e. polyethylene with a density of at least 0.94 g/cm$^3$, generally 0.95 to 0.97 g/cm$^3$. The first polymer comprises 25 to 75%, preferably 30 to 70% particularly 35 to 65% by weight of the total polymeric component.

The second polymer is an ethylene copolymer or terpolymer in which the first monomer is ethylene of the formula —CH$_2$CH$_2$—, and the second monomer is an alkyl acrylate having the formula —CH$_2$=CHCOOC$_m$H$_{2m+1}$—, where m is at least 4 and at most 8, e.g. m equals 4. The second monomer comprises at most 25%, preferably at most 20%, particularly at most 15%, e.g. 5 to 10%, by weight of the second polymer. Preferred copolymers are ethylene/butyl acrylate copolymer (also referred to as ethylene/n-butyl acrylate) and ethylene/isobutyl acrylate copolymer, for which m equals 4.

When the second polymer is a terpolymer, it comprises a third monomer which comprises at most 10% preferably at most 8%, particularly at most 5%, by weight of the second polymer. Appropriate third monomers are glycidyl methacrylate and maleic anhydride.

The second polymer comprises 25 to 75%, preferably 30 to 70%, particularly 35 to 65% by weight of the total polymeric component.

For some applications it may be desirable to blend the first and second polymers with one or more additional polymers, e.g. an elastomer, an amorphous thermoplastic polymer, or another crystalline polymer, in order to achieve specific physical or thermal properties, e.g. flexibility or maximum exposure temperature.

To maximize the benefits of the mixture of first and second polymers, it is preferred that the two polymers cocrystallize, i.e. at least a portion of each of the two crystalline polymers is homologous with the other polymer. When the first and second polymers are intimately mixed in the molten state, the homologous portion of the first polymer forms crystals with the homologous portion of the second polymer, i.e. cocrystallizes. It is proposed that the improvement in electrical and thermal stability of the compositions of the invention is due to such cocrystallization. The cocrystallization results in an improvement in the heat of fusion and an increase in PTC anomaly height. The degree of cocrystallization of the nonconductive polymers, i.e. the polymeric component without any conductive filler, can be determined by using a linear mixture rule such as the rule of mixtures and following the procedure described below. The rule of mixtures is described on pages 5 to 9 of "Predicting the Properties of Mixtures: Mixture Rules in Science and Engineering" by Lawrence E. Nielsen (Marcel Dekker, Inc., 1978), the disclosure of which is incorporated herein by reference. In this rule, a calculation for the predicted value of the heat of fusion of the blend is determined by the following formula:

$$P_B = P_{HDPE}(\text{wt \% HDPE}) + P_{CO}(\text{wt \% ethylene copolymer})$$

where P represents the given property (i.e. the heat of fusion), $P_B$ is the predicted value of the heat of fusion of the blend, $P_{HDPE}$ is the measured value of the heat of fusion for the first polymer (i.e. 100% HDPE), and $P_{CO}$ is the measured value of the heat of fusion for the second polymer (i.e. 100% ethylene copolymer). The difference between the predicted value for the mixture $P_B$ and the actual measured value of the heat of fusion for the mixture is a gauge of the extent of cocrystallization.

The particulate conductive filler which is dispersed in the polymeric component may be any suitable material, including carbon black, graphite, metal, metal oxide, conductive coated glass or ceramic beads, particulate conductive polymer, or a combination of these. The filler may be in the form of powder, beads, flakes, fibers, or any other suitable shape. The quantity of conductive filler needed is based on the required resistivity of the composition and the resistivity of the conductive filler itself. For many compositions the conductive filler comprises 20 to 70% by weight, preferably 25 to 65% by weight, particularly 30 to 60% by weight of the total weight of the composition.

The conductive polymer composition may comprise additional components, such as antioxidants, inert fillers, nonconductive fillers, radiation crosslinking agents (often referred to as prorads or crosslinking enhancers), stabilizers, dispersing agents, coupling agents, acid scavengers (e.g. CaCO$_3$), or other components. These components generally comprise at most 20% by weight of the total composition.

Dispersion of the conductive filler and other components may be achieved by melt-processing, solvent-mixing, or any other suitable means of mixing. Following mixing the composition can be melt-shaped by any suitable method to produce a conductive polymer element for use in an electrical device. Suitable methods include melt-extruding, injection-molding, compression-molding, and sintering. For many applications, it is desirable that the composition be extruded into sheet from which the element may be cut, diced, or otherwise removed. The element may be of any shape, e.g. rectangular, square, circular, or annular. Depending on the intended end-use, the composition may undergo various processing techniques, e.g. crosslinking or heat-treatment, following shaping. Crosslinking can be accomplished by chemical means or by irradiation, e.g. using an electron beam or a Co$^{60}$ $\gamma$irradiation source, and may be done either before or after the attachment of the electrode. Devices of the invention may be crosslinked to the equivalent of a total of 200 Mrads, although much lower levels, e.g. 5 to 20 Mrads, may be appropriate for low voltage (i.e. less than 60 volts) applications.

The composition generally exhibits positive temperature coefficient (PTC) behavior, i.e. it shows a sharp increase in resistivity with temperature over a relatively small temperature range, although for some applications, the composition may exhibit zero temperature coefficient (ZTC) behavior. In this specification, the term "PTC" is used to mean a composition or device which has an $R_{14}$ value of at least 2.5 and/or an $R_{100}$ value of at least 10, and it is preferred that the composition or device should have an $R_{30}$ value of at least 6, where $R_{14}$ is the ratio of the resistivities at the end and the beginning of a 14° C. range, $R_{100}$ is the ratio of the resistivities at the end and the beginning of a 100° C. range, and $R_{30}$ is the ratio of the resistivities at the end and the beginning of a 30° C. range. Generally the compositions of the invention which exhibit PTC behavior show increases in resistivity which are much greater than those minimum values.

The compositions of the invention may be used to prepare electrical devices, e.g. circuit protection devices, heaters, sensors, or resistors, in which an element composed of the conductive polymer composition is in physical and electrical contact with at least one electrode which is suitable for connecting the element to a source of electrical power. The type of electrode is dependent on the shape of the element, and may be, for example, solid or stranded wires, metal foils, metal meshes, or metallic ink layers. Electrical devices of the invention can have any shape, e.g. planar, axial, or dogbone, but particularly useful devices comprise two laminar electrodes, preferably metal foil electrodes, and a conductive polymer element sandwiched between them. Particularly suitable foil electrodes are disclosed in U.S. Pat. Nos. 4,689,475 (Matthiesen), 4,800,253 (Kleiner et al), and pending U.S. application Ser. No. 08/255,584 (Chandler et al, filed Jun. 8, 1995, the disclosure of each of which is incorporated herein by reference. Additional metal leads, e.g. in the form of wires or straps, can be attached to the foil electrodes to allow electrical connection to a circuit. In addition, elements to control the thermal output of the device, e.g. one or more conductive terminals, can be used. These terminals can be in the form of metal plates, e.g. steel, copper, or brass, or fins, which are attached either directly or by means of an intermediate layer such as solder or a conductive adhesive, to the electrodes. See, for example, U.S. Pat. No. 5,089,801 (Chan et al), and pending U.S. application Ser. No. 07/837,527 (Chan et al, filed Feb. 18, 1992), abandoned in favor of U.S. application Ser. No. 08/087,017, now U.S. Pat. No. 5,436,609. For some applications, it is preferred to attach the devices directly a circuit board. Examples of such attachment techniques are shown in U.S. application Ser. Nos. 07/910,950 (Graves et al, filed Jul. 9, 1992), 08/121,717 (Siden et al, filed Sep. 15, 1993), and 08/242,916 (Zhang et al, filed May 13, 1994, and in International application No. PCT/US93/06480 (Raychem Corporation, filed Jul. 8, 1993). The disclosure of each of these patents and applications is incorporated herein by reference.

Compositions of the invention can be formed into device assemblies in which the composition is in contact with, generally sandwiched between, two metal foil electrodes. The term "device assembly" includes both devices which are ready for connection to other electrical components and structures which, after further processing if necessary, can be divided into a plurality of electrical devices. Such device assemblies are described in U.S. application Ser. Nos. 08/121,717 (Siden et al, filed Sep. 15, 1993), and 08/242,916 (Zhang et al, filed May 13, 1994, the disclosures of which are incorporated herein by reference.

Circuit protection devices generally have a resistance of less than 100 ohms, preferably less than 50 ohms, particularly less than 30 ohms, especially less than 20 ohms, most especially less than 10 ohms. For many applications, the resistance of the circuit protection device is less than 1 ohm, e.g. 0.010 to 0.500 ohms. When used for circuit protection devices, the conductive polymer composition has a resistivity at 20° C., $\rho_{20}$, of less than 10 ohm-cm, preferably less than 7 ohm-cm, particularly less than 5 ohm-cm, especially less than 3 ohm-cm, e.g. 0.005 to 2 ohm-cm. Heaters generally have a resistance of at least 100 ohms, preferably at least 250 ohms, particularly at least 500 ohms. When the electrical device is a heater, the resistivity of the conductive polymer composition is preferably higher than for circuit protection devices, e.g. $10^2$ to $10^5$ ohm-cm, preferably $10^2$ to $10^4$ ohm-cm.

Compositions of the invention are particularly suitable for making circuit protection devices for use in battery applications, especially when the circuit protection device is electrically connected to one or more batteries in an assembly. Batteries, particularly those such as nickel/cadmium batteries and nickel/metal hydride batteries used in rechargeable battery packs, must be protected from external short circuits and overcharging due to faulty chargers or excessive charging. In addition, nickel/metal hydride batteries will vent at temperatures greater than about 80° C., thus releasing gases such as $H_2$ and $H_2O_2$. In order to protect such nickel/metal hydride batteries, it is necessary that the circuit protection device "trip", i.e. switch from its low resistance, low temperature state into its high resistance, high temperature state, by an ambient temperature of 80° C. at a specified current, the trip current $I_T$. $I_T$ depends on the geometry and resistance of the device and the thermal environment, among other factors, but is often less than about 2 A, e.g. about 1 A. To be functional under normal use conditions, however, it is necessary that the device not trip when exposed to a similar specified current at 60° C., i.e. that it have a specified hold current $I_H$. Thus, for example, to be functional, a device might require a hold current $I_H$ at 60° C. of at least 1 A and a trip current $I_T$ at 80° C. of at most 1 A. Useful devices of the invention have a ratio of $I_T$ at 80° C. to $I_H$ at 60° C. of at most 1.3, preferably at most 1.25, particularly at most 1.20, and a ratio of $I_H$ at 80° C. to $I_H$ at 60° C. of at most 0.60, preferably at most 0.55, particularly at most 0.50. Compositions of the invention, especially those comprising ethylene/butyl acrylate as the second polymer, will produce devices which meet these criteria, while devices prepared from conventional compositions based on ethylene/acrylic acid copolymer do not.

The invention is illustrated by the drawing in which FIG. 1 shows in plan view a device 1 of the invention. Conductive polymer element 3 is sandwiched between two metal foil electrodes 5, 7.

The invention is illustrated by the following examples, in which Examples 1 and 2 are comparative.

EXAMPLES 1 to 10

For each Example, the designated formulation listed in Table I was mixed in a Brabender mixer heated to 175° C. for 15 minutes at a rate of 60 rpm. The mixture was extruded into a sheet with a thickness of 0.25 mm (0.010 inch). Pieces cut from the sheet were sandwiched between two sheets of 2.5 mm- (0.001 inch-) thick nickel-coated copper electrodeposited foil (available from Fukuda) and laminated, either by compression-molding or nip-lamination. The laminate was irradiated to 10 Mrad using a 1.5 MeV electron beam and cut into devices. For Examples 1 to 3, devices for humidity testing had dimensions of 12.7×12.7 mm (0.5×0.5 inch). All other devices were in the form of annular disks with an outer diameter of 13.6 mm (0.537 inch) and an inner diameter of 4.4 mm (0.172 inch). The following tests were conducted. For most tests, the initial resistance of the device at 25° C. $R_i$, was measured. Periodically during the test, the device was removed from the test fixture. After one hour at 25° C. the final resistance $R_f$ was measured and the ratio of $R_f/R_i$ was determined.

Humidity Testing

Devices were inserted into an oven maintained at 85° C. and 85% humidity and removed periodically. The $R_f/R_i$ values showed that the devices comprising ethylene/butyl acrylate copolymer had less resistance increase than devices comprising the conventional ethylene/acrylic acid copolymer.

Trip Endurance

Devices were tested in a circuit consisting of the device in series with a switch, a 15 volt DC power source, and a fixed resistor which limited the initial current to 40 A. The device was tripped into the high resistance state and removed periodically. The results showed that devices comprising the EBA compositions were more stable than those with EAA.

THF Exposure

To test the effects of solvents on the resistance stability of the compositions, devices from Examples 1 and 3 were suspended in a sealed glass bottle containing tetrahydrofuran (THF) at 25° C. Periodically, the devices were removed from the solvent and wiped dry. The results showed that the devices comprising the EBA compositions were more stable than those with EAA.

Resistance v. Temperature

Figure 2:
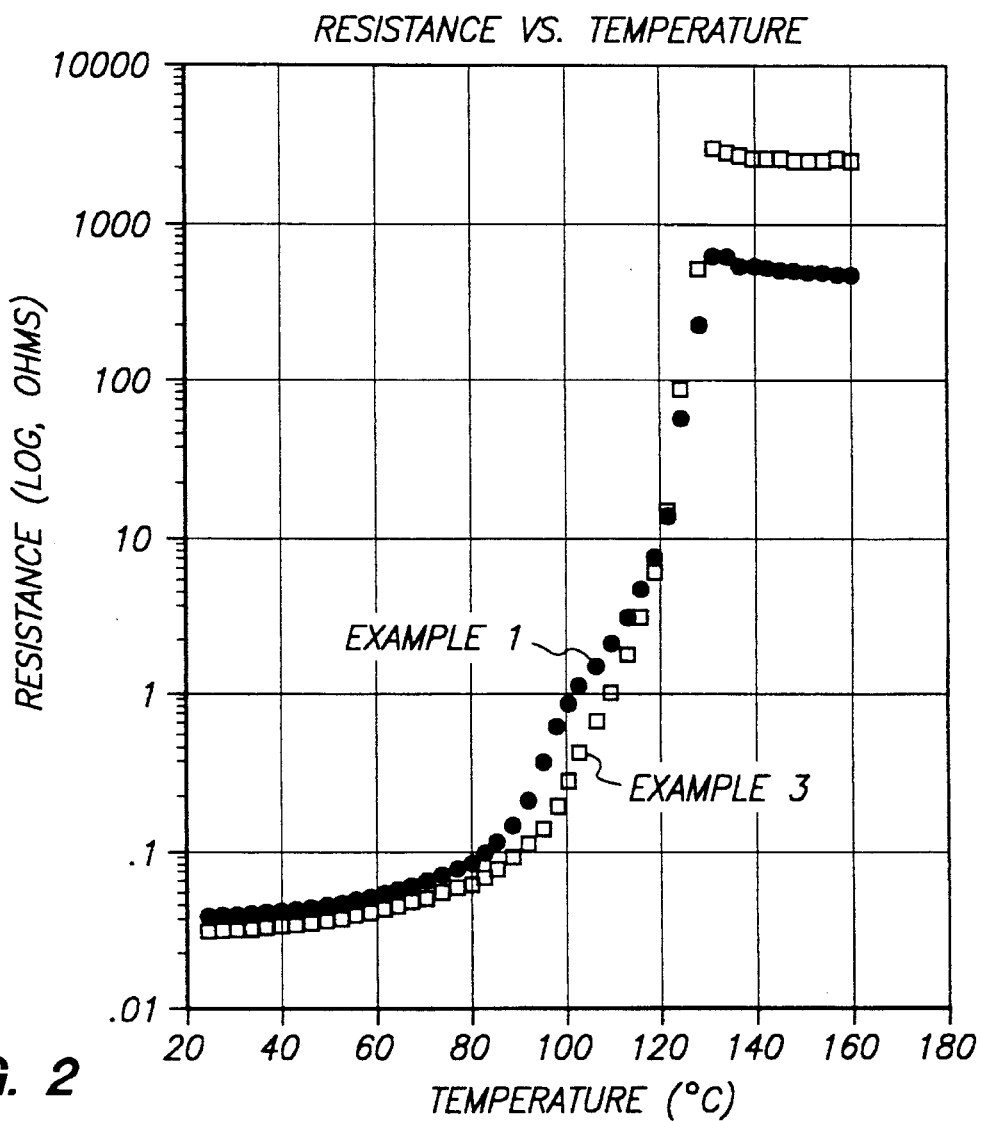
FIG. 2 is a graph of resistance as a function of temperature for a device prepared from a composition of the invention and a conventional device.

Devices of Examples 1 and 3, each having a resistance of 0.029 ohms, were inserted into an oven. The temperature of the oven was increased from 20° to 160° C. at a rate of 2° C./minute and the resistance was measured. The results, shown in FIG. 2, indicated that the device comprising the EBA composition had a peak resistance of 2540 ohms, while that comprising EAA had a peak resistance of 685 ohms.

Surface Temperature

Figure 3:
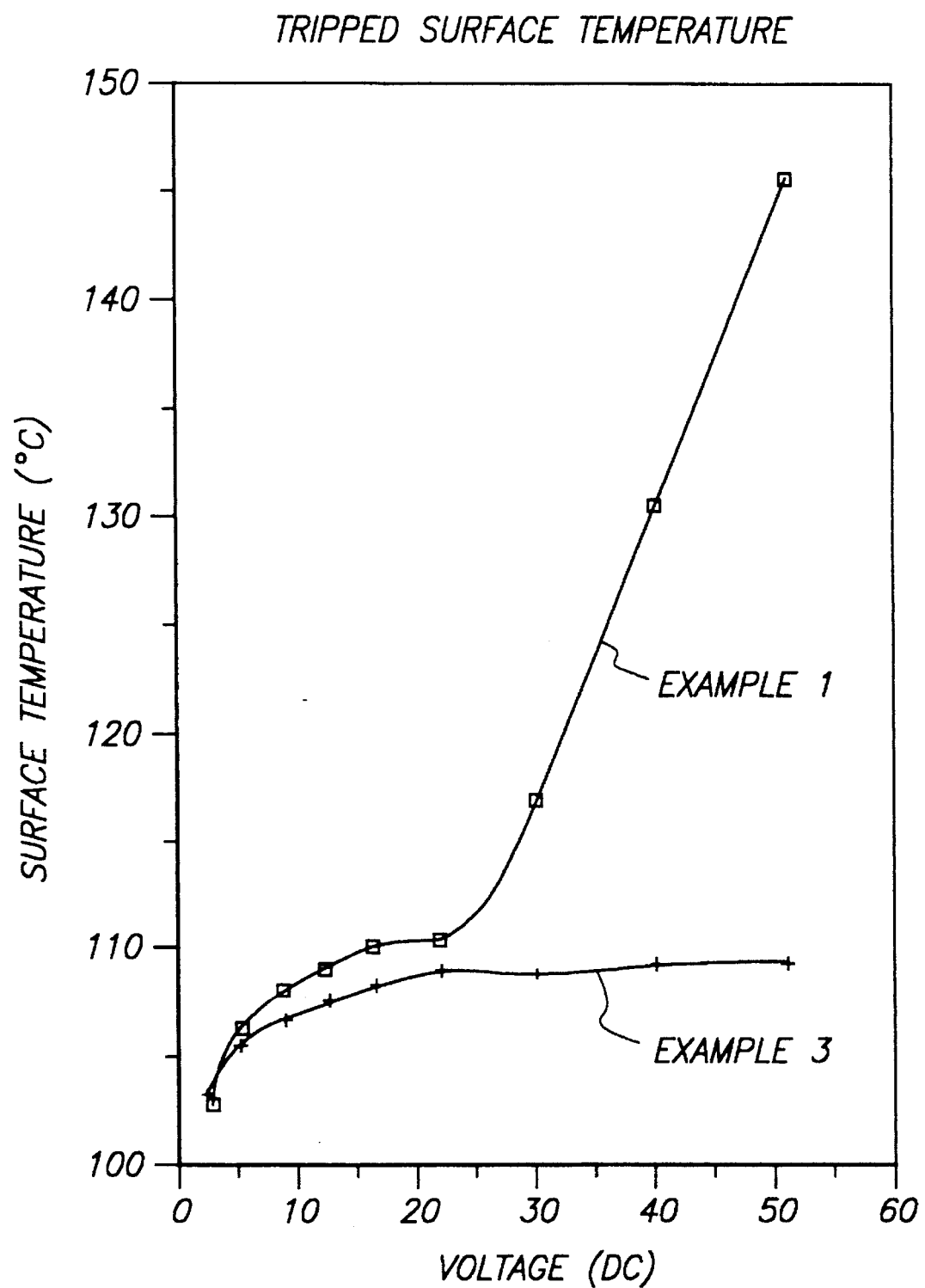
FIG. 3 is a graph of the surface temperature of a device of the invention as a function of applied voltage.

Devices of Examples 1 and 3 were inserted into a circuit in series with a switch, a DC power source, and a variable resistor which limited the initial current to 10 A. At a number of different voltages, i.e. 3 VDC to 50 VDC, the device was tripped into the high resistance state. After one minute, the surface temperature of the device was measured using a Heimann IR pyrometer, model KT19.B2. The results, shown in FIG. 3, indicated that the device comprising the EBA composition had a relatively stable surface temperature of 108° C. over a range from 6 to 50 VDC, while the device comprising EAA had a rapid increase in surface temperature at voltages greater than 20 VDC.

Voltage Withstand

Figure 4:
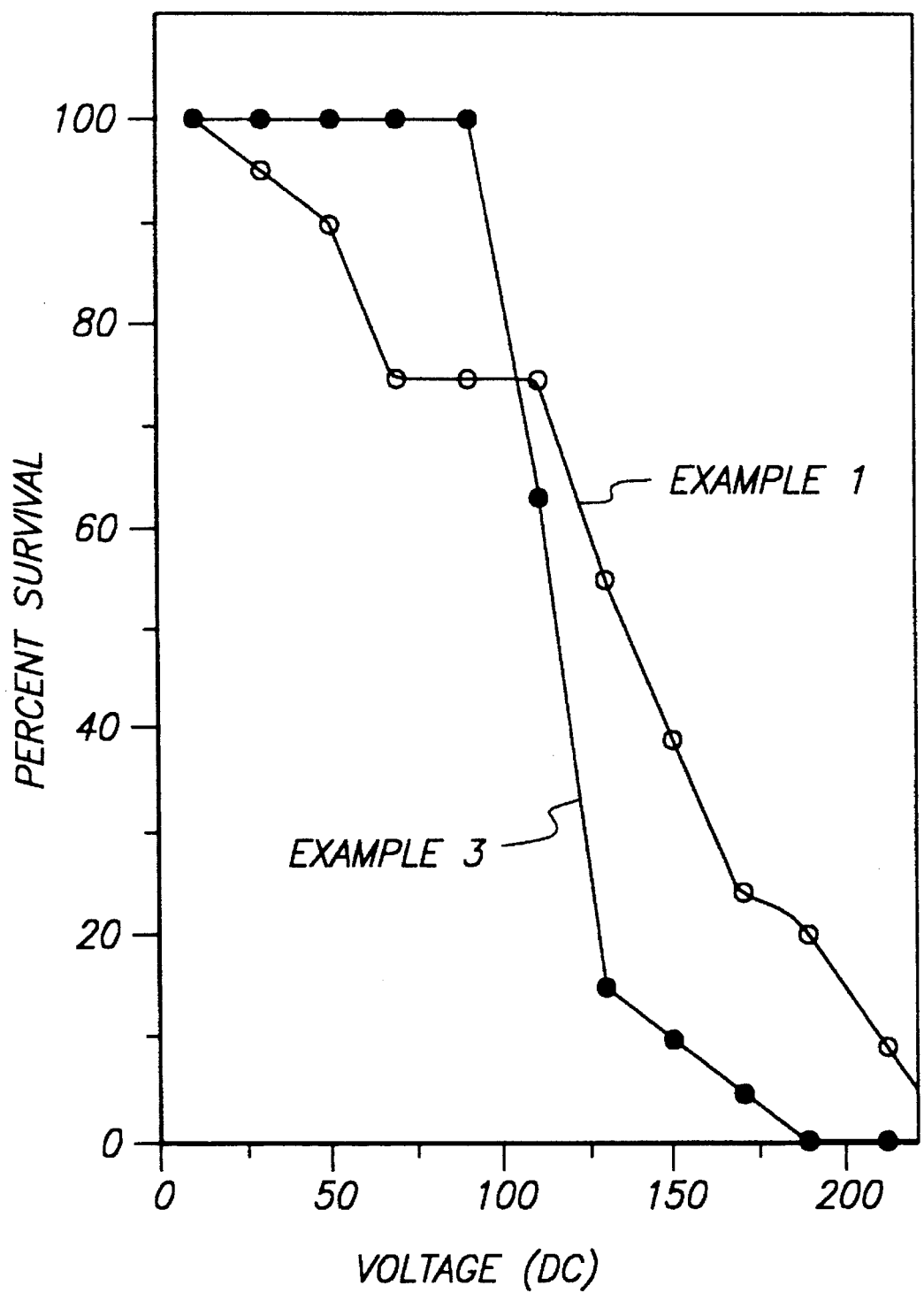
FIG. 4 is a graph of the percent survival of devices as a function of applied voltage.

Devices of Examples 1 and 3 were inserted into a circuit in series with a switch and a DC power source. Starting at 10 VDC, power was applied in 20 volt increments for 5 seconds, then turned off for 60 seconds. The device was deemed to have failed when an electrode came off or when the device arced and burned. The results, shown in FIG. 4, plot the percentage of the 20 devices tested as a function of applied voltage. The device comprising the EBA composition had excellent survival statistics up to 110 VDC, while the statistics for the device comprising EAA had poorer overall survival.

TABLE I

| | Example | | | | | | | | | |
|---|---|---|---|---|---|---|---|---|---|---|
| | 1 | 2 | 3 | 4 | 5 | 6 | 7 | 8 | 9 | 10 |
| Formulation (Weight %) | | | | | | | | | | |
| HDPE | 22.1 | 22.1 | 22.1 | 20.3 | 17.7 | 12.7 | 22.6 | 28.1 | 33.0 | 38.0 |
| EEA | 27.6 | | | | | | | | | |
| EMA | | 27.6 | | | | | | | | |
| EBA1 | | | 27.6 | 30.4 | 33.0 | 38.0 | | | | |
| EBA2 | | | | | | | 28.1 | 22.6 | 17.7 | 12.7 |
| CB | 50.3 | 50.3 | 50.3 | 49.3 | 49.3 | 49.3 | 49.3 | 49.3 | 49.3 | 49.3 |
| Ratio | 1.25 | 1.25 | 1.25 | 1.50 | 1.86 | 3.00 | 1.25 | 0.80 | 0.54 | 0.33 |
| Humidity Testing ($R_f/R_i$ after hours at 85° C./85% humidity) | | | | | | | | | | |
| $R_i$ (mΩ) | 21 | 21 | 21 | 47 | 46 | 40 | 40 | 47 | 44 | 44 |
| 100 | 1.19 | 1.14 | 1.10 | 1.03 | 1.03 | 1.07 | 1.23 | 1.08 | 1.03 | 0.98 |
| 300 | 1.29 | 1.19 | 1.19 | 0.98 | 0.99 | 1.25 | 1.79 | 1.15 | 0.94 | 0.86 |
| 500 | 1.48 | 1.19 | 1.29 | | | | | | | |
| 700 | 2.00 | 1.33 | | | | | | | | |
| 1000 | | | 1.38 | | | | | | | |
| 1075 | 4.52 | 2.29 | | | | | | | | |
| 2000 | | | 2.86 | | | | | | | |
| 4225 | | | | 1.21 | 1.28 | 2.13 | 4.35 | 1.51 | 1.00 | 0.93 |
| Trip Endurance ($R_f/R_i$ after hours at 15VDC) | | | | | | | | | | |
| $R_i$ (mΩ) | 30 | | 25 | 41 | 38 | 54 | 49 | 50 | 49 | 35 |
| 112 | | | 2.68 | 1.95 | 1.92 | 2.11 | 3.00 | 2.57 | 2.28 | 1.97 |
| 260 | | | | 2.37 | 2.53 | 2.28 | 4.65 | 3.71 | 3.14 | 2.63 |
| 500 | 24.5 | | 3.72 | | | | | | | |
| 1000 | 48.3 | | 6.92 | | | | | | | |
| THF Exposure ($R_f/R_i$ after hours in THF at 23° C.) | | | | | | | | | | |
| $R_i$ (mΩ) | 25 | | 23 | | | | | | | |
| 12 | 1.70 | | 1.53 | | | | | | | |
| 23 | 2.49 | | 2.04 | | | | | | | |
| 40 | 5.34 | | 3.12 | | | | | | | |
| 88 | 112 | | 43 | | | | | | | |

Notes to Table I:
HDPE is Petrothene ™ LB832 high density polyethylene, available from Quantum Chemical Corporation.
EAA is Primacor ™ 1320 ethylene/acrylic acid copolymer containing 6.5% acrylic acid, melt index 2.5 g/10 min., available from Dow.
EMA is Escor ™ XS11-04 ethylene/methyl acrylate copolymer containing 6.0% methyl acrylate, melt index 6.0 g/10 min., available from Exxon.
EBA1 is Enathene ™ EA 705-009 ethylene/n-butyl acrylate copolymer containing 5% n-butyl acrylate, melt index 3.0 g/10 min., available from Quantum Chemical Corporation.
EBA2 is Enathene ™ EA 719-009 ethylene/n-butyl acrylate copolymer containing 19% n-butyl acrylate, melt index 0.3 g/10 min., available from Quantum Chemical Corporation.
CB is Raven ™ 430 carbon black, available from Columbian Chemicals.
Ratio is the weight ratio of the ethylene copolymer to HDPE.

EXAMPLES 11 to 21

To determine the extent of cocrystallization between the polyethylene and the ethylene copolymer, a number of blends of HDPE (Petrothene™ LB832), EAA (Primacot™ 1320), and EBA (Enathene™ EA 705-009) were prepared. After mixing the formulations specified in Table II in a Brabender mixer, slabs were compression-molded and samples (about 7.5 mg) were cut. Each sample was heated in a Seiko 220C differential scanning calorimeter (DSC) from 20° to 200° C. at 10° C./minute (first heating cycle), held at 200° C. for 10 minutes, and cooled to 20° C. at 10° C./minute (first cooling cycle). In a first set of experiments, the samples were then heated again to 200° C. at a rate of 10° C./minute. Peak temperatures from the melting endotherms were recorded as the melting point ($T_m$) of the composition. Two melting points ($T_{m1}$ and $T_{m2}$) were recorded for mixtures, one for each endotherm. In addition, the area under the melting endotherm of the HDPE, EAA, and EBA controls was recorded as the heat of fusion ($H_f$), and the overall area under the peaks for the blends was recorded as the heat of fusion for the blends.

Figure 5:
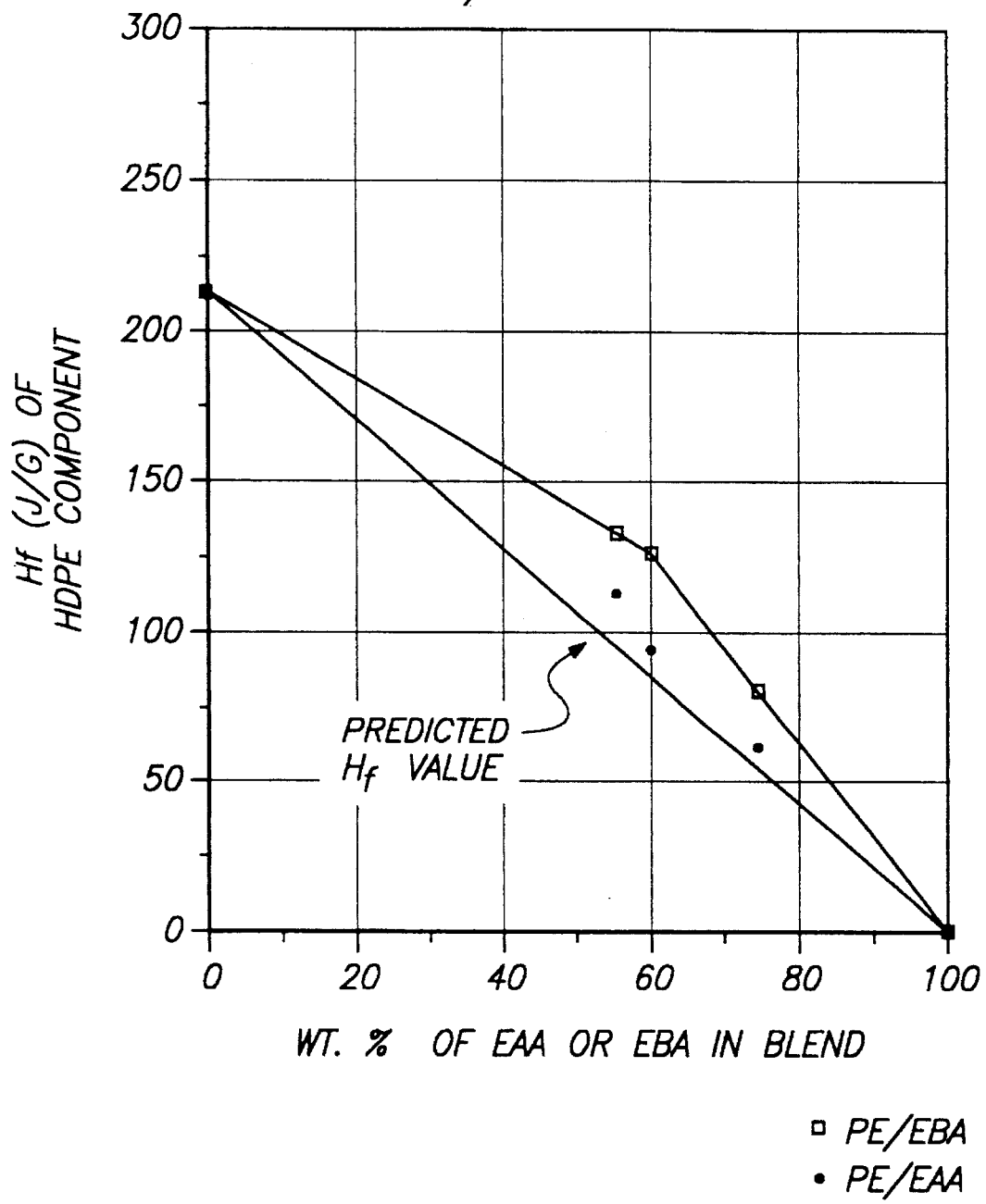
FIG. 5 is a graph of the heat of fusion as a function of the weight percent of ethylene copolymer in the composition.

In a second set of experiments, for the second cycle, those blends containing EAA were heated to 115° C. and those containing EBA were heated to 120° C., the temperatures at which the EAA and the EBA, respectively, were completely melted. The heat of fusion data were then recorded for the second heating endotherm for the single peak (i.e. either the EAA or EBA) and compared to calculated values determined using a linear mixture rule. The linear mixture rule, the rule of mixtures, is described on pages 5 to 9 of "Predicting the Properties of Mixtures: Mixture Rules in Science and Engineering" by Lawrence E. Nielsen (Marcel Dekker, Inc., 1978), the disclosure of which is incorporated herein by reference. For these calculations, the following formula was used:

$$P_B = P_{HDPE}(\text{wt \% HDPE}) + P_{CO}(\text{wt\% ethylene copolymer})$$

where P represents the given property (i.e. the heat of fusion), $P_B$ is the predicted value of the property of the blend, $P_{HDPE}$ is the measured value of the property for the first polymer (i.e. 100% HDPE), and $P_{CO}$ is the measured value of the property for the second polymer (i.e. 100% ethylene copolymer, either EAA or EBA). The results indicated that the difference between the calculated and measured heat of fusion for the EAA component in the HDPE/EAA blend was substantially smaller than the similar difference for the EBA in the HDPE/EBA blend. The percent difference between the calculated and the actual $H_f$ values is shown in Table II. We propose that this larger difference for the EBA/HDPE blends is a reflection of the cocrystallization between the EBA and HDPE. A substantial amount of EBA crystallizes with the higher melting HDPE and is not included in the melting endotherm below 120° C. The extent of cocrystallization between the EAA and the HDPE is substantially less, so that substantially all of the EAA present in the blend melts below 115° C. FIG. 5 shows the heat of fusion as a function of the weight percentage of the ethylene copolymer in the blend. Also shown is the predicted heat of fusion value based on the mixture rule.

TABLE II

| | Example | | | | | | | | | | |
|---|---|---|---|---|---|---|---|---|---|---|---|
| | 11 | 12 | 13 | 14 | 15 | 16 | 17 | 18 | 19 | 20 | 21 |
| Formulation (Weight %) | | | | | | | | | | | |
| HDPE | 100 | 0 | 0 | 75 | 45 | 40 | 25 | 75 | 45 | 40 | 25 |
| EAA | 0 | 100 | 0 | 25 | 55 | 60 | 75 | 0 | 0 | 0 | 0 |
| EBA1 | 0 | 0 | 100 | 0 | 0 | 0 | 0 | 25 | 55 | 60 | 75 |
| First Heating Cycle | | | | | | | | | | | |
| $T_{m1}$ (°C.) | | 101.5 | 105.5 | 100.0 | 100.0 | 100.5 | 100.5 | | 103.0 | 102.0 | 102.0 |
| $T_{m2}$ (°C.) | 131.5 | | | 132.0 | 130.5 | 131.0 | 130.0 | 130.5 | 131.0 | 128.5 | 129.0 |
| $H_f$ (J/g) | 197 | 82 | 97 | 167 | 146 | 126 | 114 | 176 | 149 | 147 | 124 |
| First Experiment/Second Heating Cycle | | | | | | | | | | | |
| $T_{m1}$ (°C.) | | 102.0 | 105.5 | 100.0 | 99.5 | 100.5 | 101.0 | | 103.5 | 102.0 | 103.5 |
| $T_{m2}$ (°C.) | 135.0 | | | 135.0 | 133.5 | 134.0 | 133.0 | 133.5 | 133.0 | 130.0 | 130.0 |
| $H_f$ (J/g) | 214 | 80 | 94 | 185 | 148 | 135 | 117 | 185 | 154 | 152 | 121 |
| Second Experiment/Second Heating Cycle | | | | | | | | | | | |
| $T_{m1}$ (°C.) | | | | 100.0 | 100.0 | 100.0 | | | 102.0 | 102.5 | 102.5 |
| $H_f$ (J/g) | | | | 34 | 40 | 56 | | | 18 | 22 | 39 |
| Calc. $H_f$ (J/g) | | | | 44 | 48 | 60 | | | 52 | 57 | 71 |
| (Calc. $H_f$ − $H_f$)/$H_f$ (%) | | | | 29.4 | 20.0 | 7.1 | | | 189 | 159 | 82.1 |

What is claimed is:

1. A conductive polymer composition comprising
   (A) a polymeric component which comprises
       (1) a first polymer which (a) is present in an amount 25 to 75% by weight of the total polymeric component, and (b) is polyethylene, and
       (2) a second polymer which (a) is present in an amount 25 to 75% by weight of the total polymeric component, and (b) consists essentially of units derived from (i) a first monomer which is ethylene, and (ii) a second monomer which is an alkyl acrylate having the formula $CH_2{=}CHCOOC_mH_{2m+1}$, where m is at least 4; and
   (B) a particulate conductive filler which is dispersed in the polymeric component, said composition having a resistivity at 20° C., $\rho_{20}$, of less than 10 ohm-cm.

2. A composition according to claim 1 wherein the first polymer is high density polyethylene.

3. A composition according to claim 1 wherein m is at most 8.

4. A composition according to claim 1 wherein the second polymer is a copolymer.

5. A composition according to claim 4 wherein the second monomer is butyl acrylate.

6. A composition according to claim 4 wherein the second monomer is isobutyl acrylate.

7. A composition according to claim 4 wherein the second monomer is present in amount at most 20% by weight of the second polymer.

8. A composition according to claim 1 wherein the second polymer is present in amount 30 to 70% by weight of the polymeric component.

9. A composition according to claim 8 wherein the second polymer is present in amount 35 to 65% by weight of the polymeric component.

10. A composition according to claim 1 which contains 35 to 75% of the polymeric component and 25 to 65% by weight of the conductive filler.

11. A composition according to claim 1 wherein the conductive polymer composition has a positive temperature coefficient.

12. A composition according to claim 1 wherein the conductive filler is carbon black.

13. A composition according to claim 1 (wherein $\rho_{20}$ is less than 7 ohm-cm.

* * * * *

UNITED STATES PATENT AND TRADEMARK OFFICE
CERTIFICATE OF CORRECTION

PATENT NO. : 5,582,770

INVENTOR(S) : Chu et al.

DATED : December 10, 1996

It is certified that error appears in the above-identified patent and that said Letters Patent is hereby corrected as shown below:

Cover Page, References Cited [56], righthand column, after "5,436,609...338/22R", insert as a new section
--FOREIGN PATENT DOCUMENTS
WO94/10876     01/1994     WIPO     H01C 1/14--.

Cover Page, Abstract [57], line 10, replace "—$CH_2=CHCOOC_mH_{2m+1}$—" by --$CH_2=CHCOOC_mH_{2m+1}$--.

Column 2, line 30, replace "—$CH_2=CHCOOC_mH_{2m+1}$—" by --$CH_2=CHCOOC_mH_{2m+1}$--.

Column 3, line 18, replace "—$CH_2=CHCOOC_mH_{2m+1}$—" by --$CH_2=CHCOOC_mH_{2m+1}$--.

Column 4, line 37, replace "γirradiation" by --γ irradiation--.

Claim 13, line 1, replace "(wherein" by --wherein--.

Signed and Sealed this

Eighth Day of April, 1997

*Attest:*

BRUCE LEHMAN

*Attesting Officer*  Commissioner of Patents and Trademarks